United States Patent [19]

Kowel et al.

[11] 4,065,791

[45] Dec. 27, 1977

[54] INTERACTION OF IMAGES WITH STRAIN WAVES TO DERIVE FOURIER TRANSFORM COMPONENTS OF THE IMAGES

[75] Inventors: Stephen T. Kowel, Liverpool; Phillipp G. Kornreich, North Syracuse, both of N.Y.

[73] Assignee: Research Corporation, New York, N.Y.

[21] Appl. No.: 700,836

[22] Filed: June 29, 1976

Related U.S. Application Data

[63] Continuation-in-part of Ser. No. 493,990, Aug. 1, 1974, which is a continuation of Ser. No. 319,680, Dec. 29, 1972, abandoned, and a continuation-in-part of Ser. No. 499,606, Aug. 22, 1974, which is a continuation-in-part of Ser. No. 493,990, Aug. 1, 1974, and Ser. No. 434,102, Jan. 17, 1974, abandoned, and Ser. No. 365,054, May 30, 1973, Pat. No. 3,836,712, and Ser. No. 576,433, May 12, 1975.

[51] Int. Cl.² .............................................. H04N 3/14
[52] U.S. Cl. ................................................... 358/213
[58] Field of Search .................. 358/209, 213; 315/55, 315/169 TV; 250/211 J, 211 R, 20 B, 213 R; 310/8.1, 8, 8.5, 9.7

[56] References Cited

U.S. PATENT DOCUMENTS 3,836,712   9/1974   Kornreich et al. ................... 358/209

*Primary Examiner*—John C. Martin
*Attorney, Agent, or Firm*—Cooper, Dunham, Clark, Griffin & Moran

[57] ABSTRACT

A system relying on the interaction of images and strain waves uses a technique called pseudo-beam steering to obtain selected components of the two-dimensional Fourier transform of the images. In pseudo-beam steering, two intersecting strain waves are controlled so as to produce the desired effects of a third wave without actually producing such third wave. These desired effects, produced by the interaction of the two intersecting waves, correspond to the effects which would have been produced by a third wave whose direction of travel and whose frequency could be controlled as desired.

6 Claims, 6 Drawing Figures

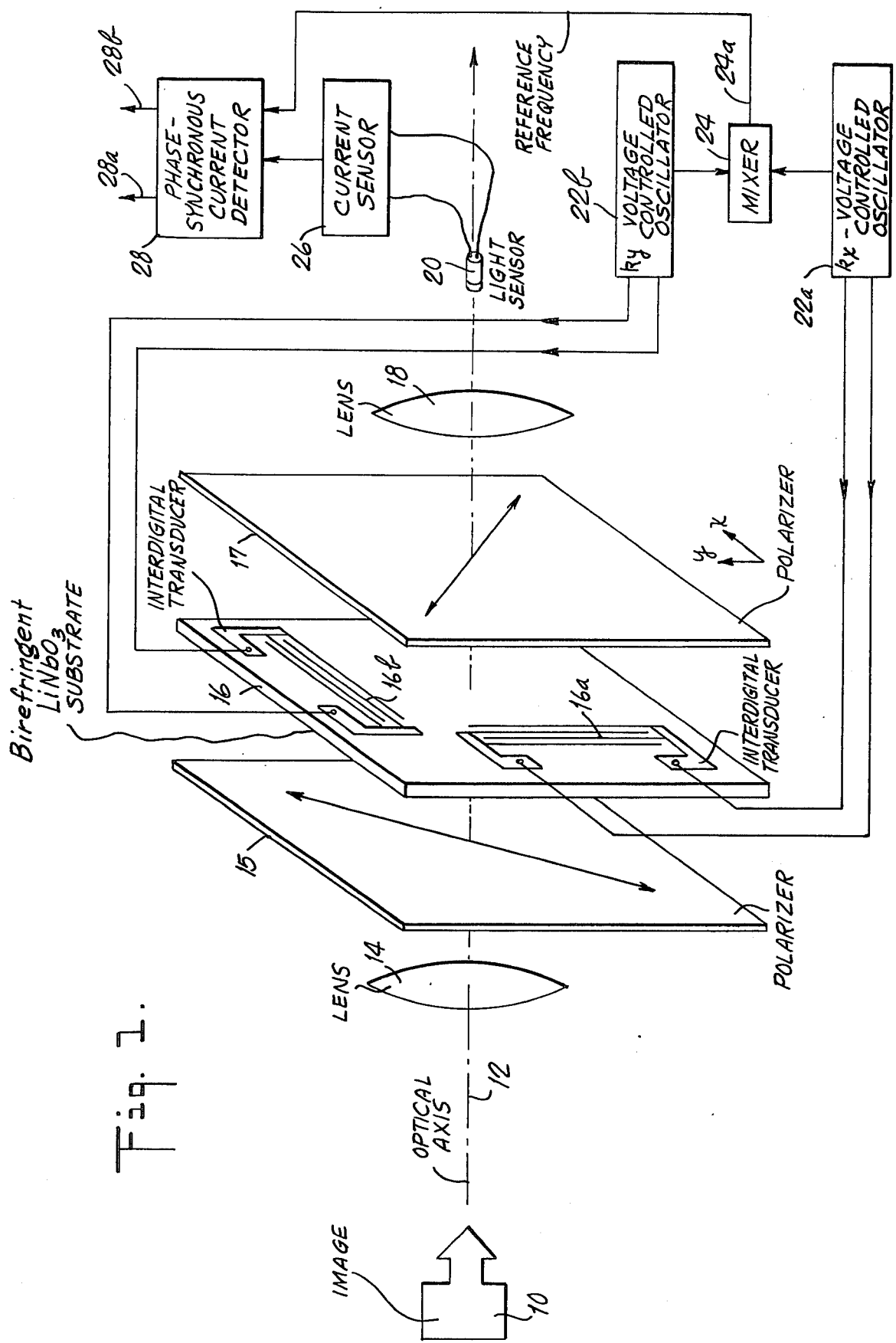

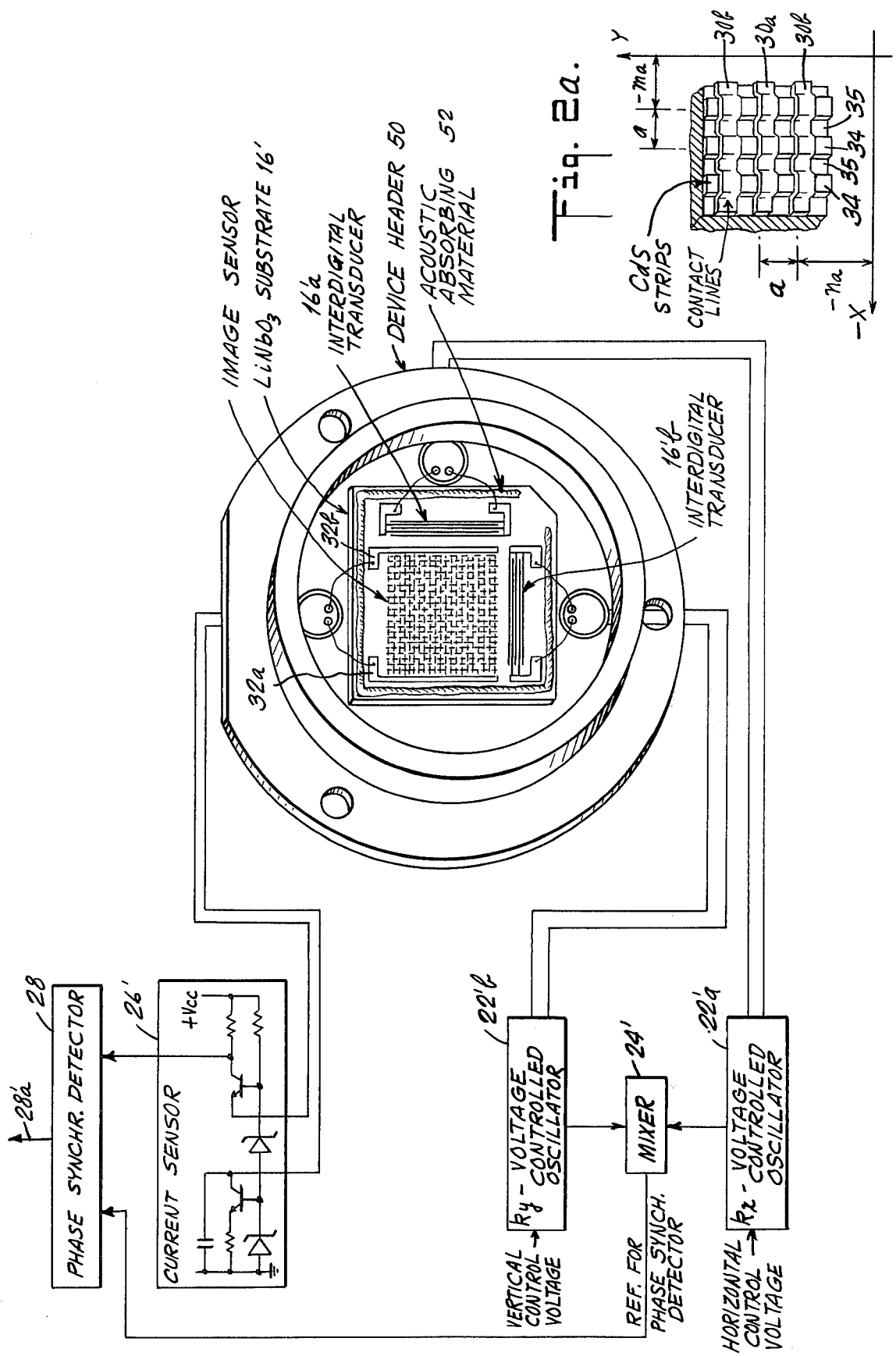

INTERACTION OF IMAGES WITH STRAIN WAVES TO DERIVE FOURIER TRANSFORM COMPONENTS OF THE IMAGES

REFERENCE TO RELATED APPLICATIONS

This application is a continuation-in-part of, and incorporates by reference, each of the following copending patent applications of the same inventors. 1) Ser. No. 493,990, filed on Aug. 1, 1974, as a continuation of Ser. No. 319,680, filed on Dec. 29, 1972 and now abandoned; 2) Ser. No. 499,606, filed on Aug. 22, 1974 as a continuation-in-part of: a) Ser. No. 493,990, filed on Aug. 1, 1974, b) Ser. No. 434,102, filed on Jan. 17, 1974 and now abandoned, and c) Ser. No. 365,054, filed on May 30, 1973 and now U.S. Pat. No. 3,836,712; and 3) Ser. No. 576,433, filed on May 12, 1975.

BACKGROUND AND SUMMARY OF THE INVENTION

The invention is in the field of directly obtaining electrical signals representative of images or of desired qualities of images by using the interaction of images and strain waves to modulate electrical properties of bodies. More specifically, the invention is directed to two-dimensional Fourier imaging using a technique called acoustic pseudo-beam steering, in which two intersecting strain waves are controlled such that they produce the desired effects of a third, pseudo-wave, which would not in fact exist.

The patent specifications referenced above describe a family of DEFT devices and techniques for certain types of electronic imaging and certain uses of such imaging. Such imaging employs coupling between strain waves, an image, and electric properties to produce electrical signals representing components of the spatial Fourier transform of the image, or representing some other desired characteristic of the image. The signals can be used for pattern recognition, all-electronic image magnification and stabilization, motion and velocity detection, focusing and the like. The electrical signals may be reconverted back to an image, if desired, using similar techniques. The patent specifications referenced above have been mainly directed to obtaining one-dimensional transforms of one-dimensional or two-dimensional images. Certain devices and techniques for achieving full two-dimensional capability have been disclosed, but there is still a need for some effective two-dimensional Fourier imaging.

Accordingly, one aspect of the invention is concerned with a new type of two-dimensional Fourier imaging using acoustic pseudo-beam steering. In such two-dimensional imaging two intersecting acoustic waves propagate along the surface of a substrate or substrates and have individually controllable frequencies which are varied in a manner producing the effects of a combined acoustic wave whose direction of travel with respect to the image can be controlled (or steered) as desired and whose frequency characteristics can be similarly controlled. No such combined acoustic wave would in fact be produced; hence the name "acoustic pseudo-beam steering" is used in this specification. This pseudo-beam steering permits the direct derivation of components of the two-dimensional spatial Fourier transform of a two-dimensional image without the difficulties attendant to producing an actual combined wave having desired travel direction and frequency characteristics.

In one specific embodiment of the invention, two surface acoustic waves traveling perpendicularly to each other (or intersecting at some other angle) propagate along a substrate having a thin photoconductive film acoustically coupled to a surface thereof. A two-dimensional image is formed on the film, and the photoconductivity of the film is measured by detecting the current $i(t)$ across the film portions between interdigital electrical contacts formed on the film. This current $i(t)$ is proportional to:

$$i(t) \propto \int \int dx\, dy\, E_z^2(x,y,t)\, I(x,y) \qquad (1)$$

where $I(x,y)$ is the two-dimensional light intensity distribution of the image in the image plane of the film, $x$ and $y$ are the coordinates in the image plane of the film, $t$ is time, and $E_z(x,y,t)$ is the electric field resulting in the substrate (e.g. a piezoelectric substrate) by the propagation of two surface acoustic waves along the x- and y-directions and is in a direction perpendicular to the image plane. Since $$E_z = E_1 \cos(\omega_1 t - k_1 x) + E_2 \cos(\omega_2 t + k_2 y) \qquad (2)$$

where $E_1$ and $E_2$ refer to electrical fields resulting in the substrate from strain waves, $\omega$ is angular frequency of a surface acoustic wave, $k = \omega/c$, where $c$ is the propagation speed of the wave, $E_1$, $\omega_1$, $k_1$ refer to the surface acoustic wave in the x-direction, and $E_2$, $\omega_2$ and $k_2$ refer to the surface acoustic wave in the y-direction. The square $E_z^2$ of the electric field $E_z(x,y,t)$ perpendicular to the image plane of the film contains a term of the form:

$$E_z^2 \propto E_1 E_2 \cos[\omega_1 - \omega_2)t - (k_1 x + k_2 y)] = E_1 E_2 \cos[(\omega_1 - \omega_2)t - \vec{k}\cdot\vec{r}] \qquad (3)$$

where $\vec{k} = k_x \hat{x} + k_y \hat{y}$ is the vector sum of the wavevectors of the two surface acoustic waves and $\vec{r} = x\hat{x} + y\hat{y}$ is a vector defining a point in the image plane ($\hat{x}$ and $\hat{y}$ are unit vectors in the x- and y-direction). By varying the respective frequencies of the two surface acoustic waves traveling in the x- and y-directions, the quantity $\vec{k}$ can be correspondingly varied, yielding a current signal term $i_s(t)$ proportional to the two-dimensional spatial Fourier transform of the image $I(x,y)$ at the image plane:

$$i_s(t) \propto \exp[j(\omega_1 - \omega_2)t] \int d^2 r\, I(\vec{r}) \exp(-j\vec{k}\cdot\vec{r}) \qquad (4)$$

where $I(\vec{r})$ is the intensity distribution of the image at the image plane, while the other terms from expression (1) can be ignored. The measured current $i_s(t)$ thus behaves as if a new, third surface acoustic wave had been created with wavevector equal to the sum of the wavevectors of the two actual surface acoustic waves.

In another specific structure embodiment of the invention, a two-dimensional image is directed along an optical axis transverse to a surface of an elasto-birefringent substrate flanked along the optical axis by two crossed polarizers. The term "elasto-birefringent" designates a material which may or may not be birefringent at rest (preferably is not), but becomes birefringent when excited by strain waves in it. Two crossed acoustic waves having individually controlled frequencies propagate along the substrate, and the light emerging from the combination of the substrate and the polarizers is collected by a measuring device providing a photocurrent signal at the difference frequency of the two acoustic waves. This photocurrent signal contains a component proportional to the $\bar{k}$ Fourier component of $I(\bar{r})$, where $\bar{k} = k_x\hat{x} + k_y\hat{y}$ is the vector sum created by the squaring effect of the birefringence, and $I(\bar{r})$ is the light intensity distribution of the image directed to the substrate surface along which the two surface waves propagate. A similar effect may be obtained by using two such substrates, one for a strain wave in the x-direction and another for a strain wave in the y-direction.

The invention therefore relates to forming an image on a selected plane of a body of a material having desired properties, propagating two intersecting or crossed strain waves along or close to that plane, and individually controlling the characteristics of the two strain waves so as to derive from the body electrical signals having characteristics determined by the combination of the characteristics of the two strain waves and having electrical parameters representative of the two-dimensional spatial Fourier transform characteristics of the image. In one specific embodiment of the invention, the image is directed along an optical axis and the image plane is a surface of an elasto-birefringent substrate along which the acoustic waves propagate and which is flanked along the optical axis by two crossed polarizers such that the light emerging along the optical axis can be measured to derive said electrical signals, while in another specific embodiment of the invention the image is formed on an electrophotoconductive film acoustically coupled to a surface of substrate along which the acoustic waves propagate and the electrical signals are derived by measuring the photoconductivity of the film. While the principles of these two specific embodiments are similar, each has certain advantages and disadvantages with respect to the other. Additionally, the invention encompasses similar modulation of the junction of two materials of opposite electrical properties, such as a PN junction, at or close to the image plane.

BRIEF DESCRIPTION OF THE DRAWINGS

FIG. 1 is a schematic representation of a structure using pseudo-beam steering in an elasto-birefringent light valve device to obtain electrical signals representative of the two-dimensional Fourier transform of a two-dimensional image.

FIG. 2 is a schematic representation of a structure using pseudo-beam steering in a film device to obtain electrical signals similarly representative of the two-dimensional spatial Fourier transform of a two-dimensional image.

FIG. 2a is an enlargement of a portion of FIG. 2.

DETAILED DESCRIPTION

Figure 3A:
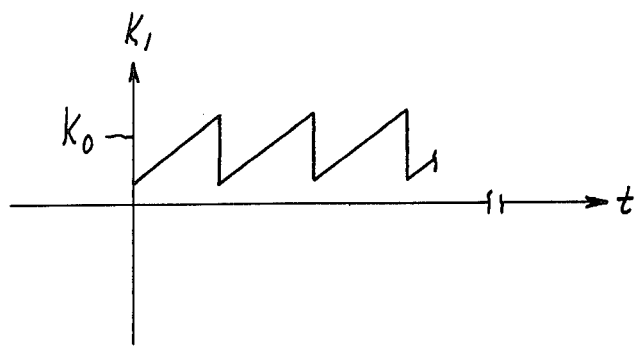
FIGS. 3a, 3b and 3c illustrate one technique of controlling the wavevectors of two strain waves to obtain the desired pseudo-beam steering effect.

Referring to FIG. 1, a two-dimensional image 10 is directed along an optical axis 12 and is focused by a lens 14 on an elasto-birefringent substrate 16 flanked along the optical axis 12 by polarizers 15 and 17, which are crossed with respect to each other. The light emerging from the polarizer 17 along the optical axis 12 is focused by a lens 18 on a light sensor 20. The image 10 is two-dimensional in the usual sense that its light intensity distribution may vary in two dimensions in a plane at an angle or perpendicular to the optical axis 12, and the polarizers 15 and 17 and the substrate 16 are also at an angle or perpendicular to the optical axis 12. Transducers 16a and 16b are coupled with the substrate 16 and are driven by respective voltage controlled oscillators 22a and 22b such that the transducer 16a generates an acoustic or strain wave propagating along the substrate 16 in the positive x-direction and the transducer 16b generates an acoustic or strain wave traveling in the substrate 16 in the negative y-direction. The oscillators 22a and 22b are connected to a mixer 24 providing at its output line 24a a signal at the difference frequency of the oscillators 22a and 22b. The light sensor 20 provides an electrical signal having a current component representative of the intensity of the light focused on it by the lens 18, and this current component is sensed by a current sensor 26. The current signal sensed by the sensor 26 and the signal at the difference frequency from the mixer 24 are applied to a phase-synchronous current detector 28, which provides at its output 28a an electrical signal corresponding to the magnitude of the current which is at the frequency of the difference frequency from the mixer 24, and may provide at its output 28b a signal indicating the phase difference between the signals at its input.

In operation, the image 10 may be a scene viewed by the lens 14 or may be an image otherwise directed along the optical axis 12 onto the lens 14. Since the polarizers 15 and 17 are crossed, little or no light would emerge from the polarizers 17 if there is no light modulation by the substrate 16. However, due to natural birefringence and due to birefringence resulting from acoustic waves generated by transducers 16a and 16b, each ray of the image traversing the substrate 16 splits into two orthogonally polarized rays, which travel inside the substrate with different phase velocities. The light pattern which emerges from the polarizer 17 and is focused by the lens 18 on the light sensor 20 produces a current whose magnitude at the difference frequency of the oscillators 22a and 22b corresponds to a term of the two-dimensional spatial Fourier transform of the two-dimensional image 10 sampled at spatial frequencies determined by the frequencies of the acoustic waves propagating along the substrate 16.

Assuming that the transducer 16a generates an acoustic wave propagating in the positive x-direction and the transducer 16b generates an acoustic wave propagating in the negative y-direction, the strain $\Sigma$ in the region of the substrate where both acoustic waves propagate is the linear superposition of the two traveling strain waves and can be expressed as:

$$\Sigma = \Sigma_{x1} \cos(k_1 x - \omega_1 t) + \Sigma_{x2} \sin(k_1 x - \omega_1 t) + \Sigma_{y1} \cos(K_2 y + \omega_2 t) + \Sigma_{y2} \sin(k_2 y + \omega_2 t) \quad (5)$$

where $\Sigma_{x1}, \Sigma_{y1}, \Sigma_{x2}, \Sigma_{y2}$ are constants which characterize the strain properties in the x- and y-direction of the image plane. The cosine and sine terms in expression (5) are due to the compression and shear portions of the wave being 90° out of phase. The image 10 is focused by the lens 14 on the region of the substrate 16 where the two acoustic waves are superimposed. Assuming that the substrate 16 is lithium niobate (LiNbO$_3$), an assumption may also be made that it operates in the Raman-Nath region, at least at the portion of the image plane of interest, so that the image rays remain parallel inside the substrate. The polarizers 15 and 17 are crossed to pass no light or a minimum amount of light when the transducers 16a and 16b are not energized. However, if the substrate 16 has some natural birefringence, the light along the axis 12 would not be completely zeroed by the crossed polarizers 15 and 17. Due to the natural birefringence and the strain-induced birefringence of the substrate 16, each ray of the light traversing it is split into two orthogonally polarized rays which travel inside the material with different phase velocities and have a phase difference δ at the time they exit from the substrate 16. The intensity distribution $I_0(x,y)$ of the light exiting the substrate 16 along the optical axis 12 can be represented by $$I_0(x,y) = I(x,y) \sin^2(\delta/2) \tag{6}$$

where $I(x,y)$ is the intensity distribution of the image at the substrate 16 perpendicular to the optical axis 12. The relationship of the strain-induced portion $\delta_s$ of this phase difference δ to the strain Σ can be represented by:

$$\delta_s = \frac{\pi L p n^3}{\lambda} \Sigma \tag{7}$$

where $p$ is a constant depending on the elasto-optical constants of the substrate 16, L is the depth of penetration of the acoustic waves, e.g. assuming that they are surface acoustic waves with a depth of approximately 2 acoustic wavelengths, $n$ is the refractive index of the substrate 16, and λ is the wavelength of light. Neglecting the electro-optic effect, since it does not significantly change the result, expression (b) can be expanded to:

$$I_0(x,y) = I(x,y) [(\frac{\delta}{2})^2 - \frac{1}{3}(\frac{\delta}{2})^4 + \ldots]. \tag{8}$$

Keeping only the first term of expression (8) yields:

$$I_0(x,y) = \frac{I(x,y)}{4} \delta^2. \tag{9}$$

The contribution of higher order terms of expression (8), which normally would have to be considered, is not important in this case since no term except the first contributes to the difference frequency which is of interest. Neglecting the natural birefringence and substituting the phase difference from expression (7) and the strain from expression (5) yields from expression (6):

$$I_0(x,y) = \frac{I(x,y)}{4} (\frac{\pi L p n^3}{\lambda})^2 [\Sigma_{x1} \cos(k_1 x - \omega_1 t) \tag{10}$$
$$+ \Sigma_{x2} \sin(k_1 x - \omega_1 t) + \Sigma_{y1} \cos(k_2 y + \omega_2 t)$$
$$+ \Sigma_{y2} \sin(k_2 y + \omega_2 t)]^2.$$

The squaring produces a term at the difference frequency of the two surface acoustic waves which, when detected by the light sensor 20, gives a photocurrent represented by $$i(t) = \frac{R}{4} (\frac{\pi L p n^3}{\lambda})^2 \int\int (I(x,y) [\Sigma_{x1}\Sigma_{y1} \cos(k_1 x + k_2 y) \tag{11}$$
$$+ \Sigma_{x2}\Sigma_{y2} \sin(k_1 x + k_2 y)] dx dy \cos[(\omega_1 - \omega_2)t]$$
$$+ \frac{R}{4} (\frac{\pi L p n^3}{\lambda})^2 \int\int (I(x,y) [\Sigma_{x1}\Sigma_{y1} \sin(k_1 x + k_2 y)$$
$$- \Sigma_{x2}\Sigma_{y2} \cos(k_1 x + k_2 y)] dx dy \sin[(\omega_1 - \omega_2)t]$$

where R is the response of the light sensor 20 and the subscripts 1 and 2 refer to the waves in the x- and y-direction. The magnitude of the detector current at the difference frequency of the two oscillators 22a and 22b can therefore be represented by:

$$|i(t)| = \frac{R}{4} (\frac{\pi L p n^3}{\lambda})^2 (\Sigma_{x1}^2 \Sigma_{y1}^2 + \Sigma_{x2}^2 \Sigma_{y2}^2)^{\frac{1}{2}} \tag{12}$$
$$([\int\int I(x,y) \cos(k_1 x + k_2 y) dx dy]^2$$
$$+ [\int\int I(x,y) \sin(k_1 x + k_2 y) dx dy]^2)^{\frac{1}{2}}$$

which corresponds to the magnitude of the two-dimensional spatial Fourier transform term of the intensity distribution $I(x,y)$ of the image 10 sampled the spatial frequency $\vec{k} = k_x \hat{x} + k_y \hat{y}$. This current has a phase characteristic relative to the phase of the pseudo-beam which corresponds to the phase of the respective Fourier transform component.

In one specific example, the substrate 16 may be lithium niobate and the light sensor 20 may be an avalanche photodiode detector for which the following values may be assumed:

$R = 200$ mA/w at .65 μm $L = 2 \times 10^{-4}$ m $p = .2$ $n = 2.2$ $\lambda = .65 \times 10^{-6}$ m $\Sigma_{x1} = \Sigma_{y1} = \Sigma_{y2} = \Sigma_{x2} = 10^{-4}$ $A = 4 \times 10^{-4}$ m² (area of the image), and $I(x,y) = 1 \times 10^{-3}$ watts integrated over $A$.

The zero-order component of the current detected by the light sensor 20 would then be $$|i(t)|_0 = 2.8 \times 10^{-6} \text{ amps}.$$

Since a detector of this type can have a dark current of 50pA, it may be possible to detect components of the Fourier transform five orders of magnitude below the $k_1 = k_2 = 0$ component. Since all image intensities have transforms which go down as $1/k$ for large $k$, each order of magnitude corresponds to a decade of spatial frequency bandwidth. The significance of this is that a great spatial bandwidth can be obtained by using a very low dark signal detector for the light sensor 20. An important characteristic of the structure shown in FIG. 1 is that the substrate responds to light substantially instantaneously, as opposed to the possibly significant rise and fall times of thin film devices, and the only limitations on rise and fall time in the structure in FIG. 1 are therefore due primarily to the characteristics of the light sensor 20, which are easier to control.

It should be noted that the expressions given above in connection with the operation of the structure in FIG. 1, as well as those given below in connection with FIG. 2, represent the present understanding the inventors have regarding the mode of operation of the relevant structures, but that additional or different phenomena may be involved and that the operation of the structures does not depend on any particular explanation or understanding of the physical phenomena that may be involved.

Referring to FIG. 2, the pseudo-beam steering technique discussed above is used in a film device which similarly obtains electrical signals representative of the two-dimensional spatial Fourier transform of a two-dimensional image. The structure of FIG. 2 is similar to that of FIG. 1 in that it includes a substrate 16', e.g. of a piezoelectric material, having similar transducers 16a' and 16b' driven by respective voltage controlled oscillators 22a' and 22b' to generate along the surface of the substrate 16' respective surface acoustic waves propagating in the negative x- and positive y-direction. The substrate 16' has, however, deposited on the top face thereof, a thin photoconductive film, e.g., a cadmium sulfide film, which is acoustically coupled to the substrate 16', and interdigital contacts in electrical contact with the film. Referring to FIG. 2a, which is an enlarged portion of FIG. 2, the interdigital contacts are electrically conductive and in the form of horizontal strips 30a alternating with horizontal strips 30b, all of the strips 30a being connected to a contact pad 32a and all of the strips 30b being connected to a contact pad 32b. The contact strips 30a and 30b form a grating across the film, the plane of the film being the image plane of interest, and thus shift the Fourier transform of the image along the $k_y$ direction to higher spatial frequencies. This allows the generation of desired Fourier transform components of an image in the image plane with surface acoustic waves having limited bandwidth. A similar effect is obtained along the $k_x$ direction by forming the cadmium sulfide film into lines 34 alternating with etched spaces 35 in the x-direction. For simplicity, the gratings may have equal dark and light spacing; it should be clear however that this only leaves one quarter of the image plane as a useful imaging portion and that a larger proportion of the image plane may be made useful by making the contact strips 30a and 30b and the spaces 35 narrower and the cadmium sulfide strips 34 wider.

In operation, an image is formed at the image plane of the cadmium sulfide film, for example by projecting an image from above the plane of FIG. 2. The current sensor 26' establishes a selected constant voltage Vo between the contact strips 32a and 32b and provides a signal indicative of the conductivity of the cadmium sulfide while the transducers 16a' and 16b' generate surface acoustic waves at selected frequencies. The output of the current sensor 26' and a signal at the difference frequency of the transducers, which is derived from a mixer 24, are applied to a phase-synchronous detector 28', which provides at its output 28a' an electrical signal. The magnitude of this electrical signal corresponds to the magnitude of the two-dimensional Fourier transform term for said difference frequency of the image formed on the plane of the cadmium sulfide film, while the phase of this electrical signal with respect to the phase of the pseudo-wave at that difference frequency corresponds to the phase of the same Fourier transform component. Since the photoconductivity of the cadmium sulfide has a term that depends on the square of the electric field present at the film, it is possible in accordance with the invention to provide mixing of the electric fields due to the two individual surface acoustic waves traveling along the substrate 16'. This mixing effect provides the effective steering or pseudo-steering of the wavevector $\bar{k}$ of the resulting transform.

Although the various electric fields and strain effects may vary through the thickness of the cadmium sulfide film, it may be assumed for simplicity that all effects are uniform across the film thickness. Thus, the $\alpha\beta$ component of the conductance $\sigma_{\alpha\beta}$ of the film per square (a square of film between two adjacent strips 30a, 30b and spaces 35) can be expanded to first order in the light intensity distribution $I(x,y)$ of the image formed on the film and in the component in the strain tensor $\Sigma_{\mu\nu}$, and to second order in the electric field components $E_\mu$, $E_\nu$ due to the surface acoustic waves traveling along the substrate 16', to yield $$\sigma_{\alpha\beta}(x,y) = \sigma^D_{\alpha\beta} + \sigma^{DS}_{\alpha\beta\mu\nu} \Sigma_{\mu\nu} + \sigma^L_{\alpha\beta} I(x,y) + \sigma^{LS}_{\alpha\beta\mu\nu} I(x,y)\Sigma_{\mu\nu} \\ + \sigma^{DF}_{\alpha\beta\mu} E_\mu + \sigma^{LF}_{\alpha\beta\mu} I(x,y) E_\mu + \sigma^{DE}_{\alpha\beta\mu\nu} E_\mu E_\nu \\ + \sigma^{LE}_{\alpha\beta\mu\nu} I(x,y) E_\mu E_\nu \ldots \quad (13)$$

where summation over like Greek indices is implied. In expression (13) above, the terms are defined as follows:

| | |
|---|---|
| $\sigma^D_{\alpha\beta}$ | is the dark conductance per square, |
| $\sigma^{DS}_{\alpha\beta\mu\nu}$ | is the change of the dark conductance per square with strain $\Sigma_{\mu\nu}$, |
| $\sigma^L_{\alpha\beta}$ | is the change of the conductance per square with light flux $I(x,y)$, the ordinary photoconductivity, |
| $\sigma^{LS}_{\alpha\beta\mu\nu}$ | is the change of the conductance per square with light and strain, |
| $\sigma^{DF}_{\alpha\beta\mu}$ | is the linear change of the conductance per square with electric field, |
| $\sigma^{LF}_{\alpha\beta\mu}$ | is the linear change of the conductance per square with light and electric field, |
| $\sigma^{DE}_{\alpha\beta\mu\nu}$ | is the change of the conductance per square to second order with the electric field, and |
| $\sigma^{LE}_{\alpha\beta\mu\nu}$ | is the change of the conductance per square to first order in the light intensity and second order in the electric field. |

Assuming that the film has essentially isotropic properties, the third rank tensors must be zero, requiring thus that the terms $$\sigma^{DF}_{\alpha\beta\mu} \text{ and } \sigma^{LF}_{\alpha\beta\mu}$$

be zero, and also requiring that ordinary photoconductivity be essentially a scalar, $\sigma_L$. The dark conductance is small compared to the photoconductance at reasonable light levels for good photoconductive film. This allows the terms $$\sigma^D_{\alpha\beta}, \sigma^{DS}_{\alpha\beta\mu\nu}, \text{ and } \sigma^{DE}_{\alpha\beta\mu\nu}$$

to be neglected and reduces expression (13) to:

$$\sigma_{\alpha\beta}(x,y) = \sigma_L \delta_{\alpha\beta} I(x,y) + \sigma^{LS}_{\alpha\beta\mu\nu} I(x,y)\Sigma_{\mu\nu} \\ + \sigma^{LE}_{\alpha\beta\mu\nu} I(x,y) E_\mu E_\nu. \quad (14)$$

Referring to FIG. 2, where the current density and the sensing DC electric field are in the y-direction, the only term of interest is the $\sigma_{yy}$ component of the conductivity tensor, which reduces expression (14) to:

$$\sigma_{yy} = \sigma_L I(x,y) + (\sigma^{LS}_{11} \Sigma_2 + \sigma^{LS}_{12} (\Sigma_1 + \Sigma_3))I(x,y) \\ + \sigma^{LE}_{11} E_z E_z I(x,y) \quad (15)$$

where the same convention is used for the fourth rank conductivity tensors $$\sigma^{LS}_{\alpha\beta\mu\nu} \text{ and } \sigma^{LE}_{\alpha\beta\mu\nu}$$

as is used for the elastic constants of isotropic materials.

The interdigital contacts 30a and 30b effectively combine all of the squares of cadmium sulfide in parallel. The current response to a constant voltage applied across the contacts results in a difference frequency $i_d$ which can be expressed as follows:

$$i_d \propto V_o \sum_{\substack{\text{over all} \\ \text{fingers in} \\ \text{contact}}} \sum_{\substack{\text{along} \\ \text{each long} \\ \text{rectangle}}} \sigma_{ij} E_i^2 I(x,y) \quad (16)$$

As the contact strips 30a and 30b become more numerous and thinner, the result becomes more accurate. Thus, the control over the frequencies of the two transducers can lead to finding arbitrary two-dimensional spatial Fourier transform components of the image formed on the cadmium sulfide film. The order in which desired terms in Fourier transforms are found and the order in which the scan in Fourier space is performed would depend on the use to which the structure is put.

Figure 3B:
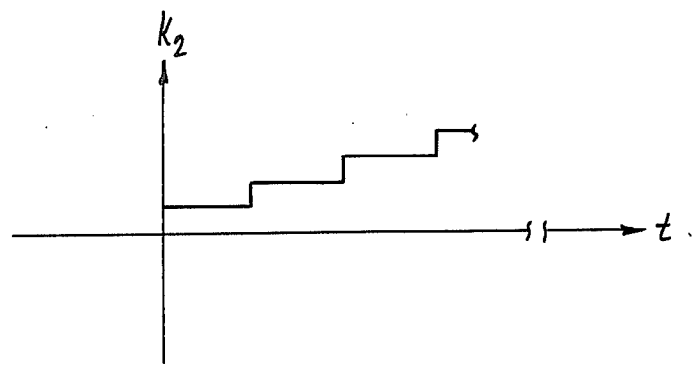
Figure 3C:
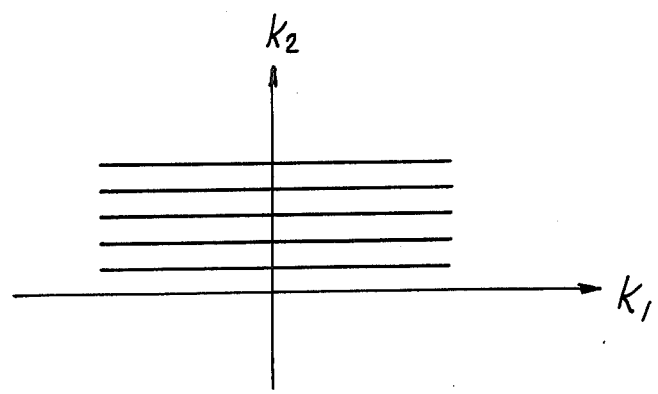

One example of controlling the frequencies of the two strain waves, for either of the devices shown in FIGS. 1 and 2, is illustrated in FIGS. 3a, 3b and 3c. In FIG. 3a the characteristic $k_1$ of one of the two intersecting strain waves is controlled with respect to time to vary in a sawtooth manner about a nominal value $k_0$. As discussed earlier, the parameter $k$ is the ratio of the angular frequency of the strain wave to the speed of propagation of the strain wave in a given material. Concurrently, the characteristic $k_2$ of the second wave is controlled as indicated in FIG. 3b as a step function, the result being that in $k_1 k_2$-space, as illustrated in FIG. 3c, the parameters $k$ are varied to form a raster pattern. This raster pattern corresponds to scanning the image in Fourier transform space along a corresponding raster pattern, and the Fourier transform components that are obtained will represent the image to a resolution determined by the choice of the height of the steps in FIG. 3b and the sawtooth pattern in FIG. 3a (and additionally determined, of course, by the characteristics of the transducers and the coupling between the transducers and the substrate or film). If the devices of FIGS. 1 and 2 are used for a purpose other than finding the Fourier transform of an image, it may be appropriate to control the two strain waves differently. For example, if the devices are used for focus detection, only a single frequency of each strain wave, or only a few frequencies of each strain wave may be needed, as opposed to the many different frequencies that would be needed for obtaining the Fourier transform of the entire image. Similarly, if the devices are used for pattern recognition, or motion detection, or similar purposes, again only a single frequency or a few frequencies of the two strain waves may be all that is needed.

As used in this specification the term "image" includes light in the visible spectrum as well as light or electromagnetic radiation in the invisible spectrum, such as infrared or ultraviolet light. The term "acoustic wave" includes strain waves not only in the audible range but through the entire range of frequencies of strain waves that may be propagated in the given substrate of interest. For background material on earlier devices that use an interaction of light and strain waves to obtain Fourier transform components of an image, reference is made to the following publications which are hereby incorporated by reference: P. G. Kornreich, S. T. Kowel, D. J. Fleming, N. T. Yang, A. Gupta, and O. Lewis, "DEFT: Direct Electronic Fourier Transforms of Optical Images," IEEE Proceedings, Vol. 62, pp. 1072-1087, August, 1974; S. T. Kowel, P. G. Kornreich, O. Lewis, A. Gupta and R. Zawada, "Progress on Two-Dimensional Direct Electronic Fourier Transform (DEFT) Devices," 1974 Ultrasonics Symposium Proceedings, pp. 763-767; P. Kornreich, N. T. Yang, and S. T. Kowel, "A Direct Electronic Fourier Transform Device for Imaging," IEEE Proc. Letters, Vol. 61, pp. 1149-1150, August 1973; and S. T. Kowel, P. G. Kornreich, O. Lewis, and F. D. Kirschner, "Passive Detection of Motion Transverse to the Optical Viewing Axis," IEEE Trans. on Instrumentation and Measurement, Vol. 1M-24, pp. 248-255, Sept. 1975. Additionally, reference is made to Boersma, British patent specification 1150625 and specifically to the technique disclosed therein for transforming an image and the mirror duplicate thereof at a different quadrant of a four quadrant space, which technique may be used in connection with the devices of FIGS. 1 and 2 in the specification to obtain phase characteristics of the transform components.

The devices in FIGS. 1 and 2 may be suitably mounted to receive the desired image, for example in a still camera or a motion or TV camera or a projector. Referring to FIG. 2, the device is illustrated as mounted on a header 50 which may be attached behind the lens of a conventional camera, with the film of the device at the film plane of the camera, and the device is shown as provided with a border of acoustic absorbing material 52, which prevents undesired scatter of strain waves. The device in FIG. 1 may be similarly mounted on a similar header and similarly provided with a border of acoustic absorbing material for the same purpose. It is noted that the device of FIG. 1 may be modified to have one substrate for a strain wave propagating in the x-direction and another substrate for a strain wave propagating in the y-direction, with the surfaces of the two substrates along which the strain waves propagate being immediately adjacent and facing each other, but being out of acoustic coupling. It is also noted that while the electric field in the device shown in FIG. 2 resulted from using a substrate of a piezoelectric material, other ways of producing a similarly modulated electric field may be used. Moreover, similar techniques may be applied to modulating the electrical characteristics of junctions (e.g. semiconductor material PN junctions) by the interaction of strain waves and images.

We claim:
1. A device comprising:
   a body of a material and means for forming a light image at a selected image surface of the body;
   means for generating at least two acoustic waves propagating along said image surface of the body at intersecting directions and having individually controllable frequency characteristics;
   means for deriving electrical signals having frequency characteristics determined by the combination of the frequency characteristics of the two acoustic waves and having electrical parameters representative of the two-dimensional spatial Fourier transform characteristics of the image formed at said image surface of the body;
   wherein the body of material comprises an elasto-birefringent substrate having a surface defining said image surface and a first and a second polarizer crossed with respect to each other and flanking the substrate along an optical axis transfers to and intersecting said image surface, and the deriving means comprise means for measuring the light emerging from the combination of the substrate and the polarizers along said optical axis while the acoustic waves propagate along the image surface and while the image is formed at the same surface.

2. A device comprising:

a body of a material and means for forming a light image at a selected image surface of the body;

means for generating at least two acoustic waves propagating along said image surface of the body at intersecting directions and having individually controllable frequency characteristics;

means for deriving electrical signals having frequency characteristics determined by the combination of the frequency characteristics of the two acoustic waves and having electrical parameters representative of the two-dimensional spatial Fourier transform characteristics of the image formed at said image surface of the body; wherein the body of material comprises a piezoelectric substrate having an electrophotoconductive film disposed at a surface thereof defining said image surface and acoustically coupled thereto and interdigital contacts disposed on the film in electrical contact therewith;

the deriving means comprise means for measuring the component of the electrical conductivity of the film for frequencies determined by both said first and second frequencies; and the electrophotoconductive film is divided into a grid of a multiplicity of individual small portions spaced from each other along the image surface.

3. A device comprising:

an elasto-birefringent substrate;

means for directing an optical signal along an optical axis transverse to an image surface of the substrate;

a first and a second polarizer crossed with respect to each other and flanking the substrate along the optical axis;

means for generating a first and a second acoustic wave propagating at intersecting directions along the image surface at respective first and second frequencies; and means for measuring the intensity of the optical signal emerging from the combination of the substrate and the polarizers along the optical axis to derive electrical signals corresponding to frequencies determined by both the first and the second frequencies and having parameters representative of the two-dimensional spatial Fourier transform characteristics of the image at said image surface of the substrate.

4. A device as in claim 3 including means for varying in a selected manner the first and second frequencies to obtain a selected set of Fourier transform characteristic terms representative of the image.

5. A device comprising:

a substrate;

an electrophotoconductive film disposed on a surface of the substrate and acoustically coupled thereto, said film defining an image surface and being divided into a pattern of individual small film portions interspersed with spaces of other material;

interdigital contacts extending along said image surface and being in electrical contact with the film;

means for generating a first and a second acoustic wave propagating at intersecting directions along said image surface of the substrate at respective first and second frequencies;

means for forming an image on the film; and means for deriving from the interdigital contacts electrical signals corresponding to frequencies determined by both the first and the second frequencies and having parameters representative of the two-dimensional spatial Fourier transform characteristics of the image formed at the image surface.

6. A device as in claim 5 wherein the substrate is made of a material generating at the film an electrical field of desired characteristics determined by the first and second strain waves propagating therein.

* * * * *